(12) United States Patent
Kuroiwa et al.

(10) Patent No.: US 7,492,132 B2
(45) Date of Patent: Feb. 17, 2009

(54) SWITCHING REGULATOR

(75) Inventors: Hiroshi Kuroiwa, Tokyo (JP); Yasuhiko Kokami, Tokyo (JP); Osamu Yamashita, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/488,833

(22) Filed: Jul. 19, 2006

(65) Prior Publication Data

US 2007/0035281 A1 Feb. 15, 2007

(30) Foreign Application Priority Data

Aug. 11, 2005 (JP) ............................ 2005-232927

(51) Int. Cl.
*G05F 1/00* (2006.01)
*G05F 1/613* (2006.01)
(52) U.S. Cl. ....................... 323/222; 323/224; 323/282; 323/283; 323/284; 323/285; 323/288
(58) Field of Classification Search ................. 323/222, 323/282, 285, 288, 224, 283
See application file for complete search history.

(56) References Cited

U.S. PATENT DOCUMENTS

| | | | | |
|---|---|---|---|---|
| 4,929,882 | A * | 5/1990 | Szepesi ....................... | 323/222 |
| 5,731,694 | A * | 3/1998 | Wilcox et al. ................ | 323/287 |
| 5,825,165 | A * | 10/1998 | Kitching et al. ............. | 323/282 |
| 5,982,160 | A * | 11/1999 | Walters et al. ............... | 323/282 |
| 6,366,066 | B1 * | 4/2002 | Wilcox ........................ | 323/282 |
| 6,580,258 | B2 * | 6/2003 | Wilcox et al. ................ | 323/282 |
| 6,674,274 | B2 * | 1/2004 | Hobrecht et al. ............ | 323/285 |
| 6,979,985 | B2 * | 12/2005 | Yoshida et al. .............. | 323/282 |
| 7,091,711 | B2 * | 8/2006 | Yoshida et al. .............. | 323/282 |
| 7,109,693 | B2 * | 9/2006 | Yoshida et al. .............. | 323/282 |
| 7,279,875 | B2 * | 10/2007 | Gan et al. .................... | 323/282 |
| 7,317,625 | B2 * | 1/2008 | Zhang et al. ................. | 363/89 |
| 2004/0004470 | A1 * | 1/2004 | Yoshida et al. .............. | 323/284 |
| 2005/0052168 | A1 * | 3/2005 | Tazawa et al. ............... | 323/282 |
| 2006/0091870 | A1 * | 5/2006 | Yoshida et al. .............. | 323/282 |
| 2006/0158168 | A1 * | 7/2006 | Yoshida et al. .............. | 323/282 |

* cited by examiner

FOREIGN PATENT DOCUMENTS

JP           2004-64994 A        2/2004

OTHER PUBLICATIONS

Jurasek et al., Hight Auto. Power Supply with Hysteretic Current Mode Controller, 1996, IEEE, 0-7803-3044-7/96 $5.00, 861-868.*

*Primary Examiner*—Akm E Ullah
*Assistant Examiner*—Jue Zhang
(74) *Attorney, Agent, or Firm*—Miles & Stockbridge P.C.

(57) ABSTRACT

The present invention provides a switching regulator having good stability compatible with a good response and an enhanced protection function. A first capacitor is placed between an output end of an inductor to generate an output voltage and a ground potential. From input voltage, a current is supplied to the inductor's input end by a first switch element. A first feedback path includes a hysteretic comparator. An output voltage added to a voltage proportional to the current flowing through the inductor is supplied to the hysteretic comparator which discriminates whether the voltage is appropriate by hysteresis characteristics and generates a PWM control signal in accordance with an output current variation. Moreover, a second feedback path is provided to feed back an error amplifier output voltage with greater gain in a low frequency domain and an attenuation loop around a PWM frequency band to the comparator's reference voltage input terminal. Feedback voltage through the second feedback path is used as a monitoring voltage in a protection circuit.

4 Claims, 12 Drawing Sheets

US 7,492,132 B2

SWITCHING REGULATOR

CROSS-REFERENCE TO RELATED APPLICATION

The present application claims priority from Japanese application No. 2005-232927 filed on Aug. 11, 2005, the content of which is hereby incorporated by reference into this application.

BACKGROUND OF THE INVENTION

The present invention relates to a switching regulator for generating a DC voltage and a technique that is effectively applicable to a switching regulator required to have a good transient response, or a technique that is effectively utilized for, for example, a switching regulator provided in a system with a large variation in consumption current.

Lately, electronic devices in which a microprocessor is embedded as a system controller are increasing. The operating frequency of the microprocessor (hereinafter referred to as CPU) tends to become higher and higher and the maximum operating current increases, as the operating frequency increases. Meanwhile, portable or similar electronic devices incorporating the CPU often use a method of stepping up or down the battery voltage by a switching regulator to supply the operating voltage to the CPU. In these devices, it is carried out to deactivate whole the CPU or a partial circuit of the CPU when the CPU do not need to operate in order to reduce the consumption of the battery. In consequence, the range in which the current consumed by the CPU varies tends to be greater, as the maximum operating current increases. Due to this, a power supply device for supplying the operating current to the CPU is required to have a good transient response to the varying output current.

As a switching regulator having a good transient response, there is a switching regulator utilizing switching control called a hysteretic current-mode control method, for example, as disclosed in U.S. Pat. No. 5,825,165 (Patent Document 1). The hysteretic current-mode control switching regulator includes a current sense resistor connected in series to a coil to detect current that flows through the coil and an error amplifier that outputs a current proportional to a difference between a voltage (feedback voltage) that is a fraction of output voltage divided by a resistance voltage divider and a reference voltage. A hysteretic comparator compares an error voltage which is represented as the product of the resistance of a resistor connected between a code connecting the coil and the sense resistor and an output terminal of the error amplifier and the output current of the error amplifier to the output voltage. The switching regulator controls to maintain the output voltage at a constant level in the following manner. When a voltage drop across the sense resistor becomes more than "error voltage+hysteresis voltage," a main switch allowing current to flow through the coil is turned from on to off and a synchronous circuit which acts to decrease the current flowing through the coil in sync with the main switch operation is turned from off to on. When the voltage drop across the sense resistor becomes lower than the error voltage, the main switch is turned from off to on and the synchronous switch is turned from on to off.

However, a problem associated with the above hysteretic current-mode control switching regulator is that additional power is consumed by the sense resistor connected in series to the coil. Since this power loss increases, as the maximum operating current increases, it would lead to a larger decrease in power efficiency in future application of the switching regulator. To decrease this power loss, it is conceivable to decrease the resistance of the sense resistor. However, an excessively small resistance of the sense resistor inhibits the monitored voltage from exceeding the hysteresis voltage of the comparator. This will result in a drawback such as a large output voltage ripple due to an unstable switching frequency.

The present applicant has previously proposed a switching regulator as an improvement over the above hysteretic current-mode control switching regulator in Japanese Unexamined Patent Publication 2004-064994 (Patent Document 2). A basic circuit of the switching regulator disclosed in this publication is shown in FIG. 8. As shown, a series circuit consisting of at least one resistor Rf1 and at least one capacitor Cf is connected in parallel with an inductor L1, and a resistor Rf2 is placed between a connection point of the resistor Rf1 and the capacitor Cf and a ground potential. An output voltage Vout added to a voltage proportional to a current flowing from the above connection point into the inductor L1 circuit is detected as a CR feedback voltage VCP. A reference voltage and the CR feedback voltage VCP are supplied to a hysteretic comparator circuit HCMP. The comparator generates a PWM control signal to switch a power output MOSFET M1 via a pre-diver. This MOSFET controls a current flowing through the inductor L1. It should be noted that a resistor DCR is connected as an equivalent series resistor (parasitic resistance) to the inductor L1 and this resistor is different from the current sense resistor as employed in switching regulator of the above Patent Document 1.

The output voltage Vout of the switching regulator described in the above Patent Document 2 can be expressed by the following equation (1): $Vout=Vref-IL \times DCR$ ... (1). Here, IL is a load current. Hence, in a domain where the load current IL is larger, the equivalent series resistance component (parasitic resistance) DCR to the inductor L1 contributes to a large drop of the output voltage Vout and the load regulation deteriorates. A smaller supply voltage such as, for example, 1.3 V, tends to be used for the CPU as mentioned above and a hard disk drive system, whereas the maximum output current as large as 2 A is required. Allowable range in which a supply voltage of the power supply device varies is generally constant, for example, 3%. In a switching regulator for application of the above-mentioned low voltage output, an absolute value of the maximum allowable voltage becomes small and, therefore, the deterioration of the load regulation ($IL \times DCR$) for the equivalent series resistance component DCR to the inductor L1 becomes non-negligible. For this reason, a circuit for preventing such load regulation deterioration, as is shown in FIG. 9, is also proposed. In this circuit, an error amplifier EA to which the reference voltage Vref and a fraction of the output voltage Vout divided by resistors Ra and Rb are input for comparison is additionally provided to generate a reference voltage to be input to the above comparator circuit HCMP.

[Patent Document 1] U.S. Pat. No. 5,825,165

[Patent Document 2] Japanese Unexamined Patent Publication 2004-064994

SUMMARY OF THE INVENTION

It has been found that the attempt to improve the load regulation by additionally providing the error amplifier, as in the switching regulator described in the above Patent Document 2, poses the following problem. Frequency-gain characteristic graphs are shown in FIG. 10. The graph (A) shows the characteristic from Vref to Vout in the basic regulator circuit of prior art of FIG. 8. As this graph indicates, the output voltage Vout decreases, as denoted by RL/(RL+DCR), and the load regulation is found to deteriorate. The graph (B) shows the gain of the error amplifier. As the graph (A)+(B) indicates, the load regulation is seen to improve in a low frequency domain, but the error amplifier has a constant gain for a PWM frequency band fPWM and thus amplifies even a ripple in the output voltage in synchronization with PWM, resulting in unstable PWM operation.

As shown in FIG. 11, the present inventors contemplated employing a capacitor C1 instead of a resistor R1, as shown in FIG. 9, in an output section of the error amplifier EA. Frequency-gain characteristic graphs with regard to this configuration are shown in FIG. 12. In the graph (A) for the basic regulator circuit of prior art of FIG. 8, the output voltage Vout decreases, as denoted by RL/(RL+DCR), and the load regulation is found to deteriorate. The graph (B) shows the gain of the error amplifier. As the graph (A)+(B) indicates, the load regulation improves in a low frequency domain and PWM operation is stable in the PWM frequency band fPWM, whereas a low band appears and the response to load variation deteriorates.

An object of this invention is to provide a switching regulator having good stability compatible with a good response. Another object of this invention is to provide a switching regulator having an enhanced protection function along with the good stability and response. The above and other objects and novel features of this invention will become apparent from the description of the present specification and the accompanying drawings.

Typical aspects of the invention disclosed herein will be summarized below. A first capacitor is placed between an output end of an inductor to generate an output voltage and a ground potential. From an input voltage, a current is supplied to the inductor's input end by a first switch element. When the first switch element is off, the inductor's input end is energized at a predetermined potential by a second switch element. A control circuit is provided which generates a PWM control signal which is supplied to the first switch element so that the output voltage matches a desired voltage. The control circuit comprises a first feedback path and a second feedback path. The first feedback path includes a hysteretic comparator circuit, a series circuit comprising a first resistor and a second capacitor placed in parallel to the inductor, and a second resistor placed between a connection point of the first resistor and the second capacitor and a ground potential of the circuit. The comparator circuit receives a first reference voltage and a potential at a connection point of the first resistor, the second resistor, and the second capacitor, discriminates whether the potential is appropriate by hysteresis characteristics, and generates the PWM control signal in accordance with an output current variation. The second feedback path includes a third resistor and a fourth resistor to generate a fractional voltage of the output voltage, an error amplifier which receives the fractional voltage and a second reference voltage and generates a first reference voltage to be input to the comparator circuit, a third capacitor placed between an output terminal of the amplifier and a ground potential of the circuit, and a series circuit comprising a fifth resistor and a fourth capacitor placed between the above output terminal and the ground potential of the circuit. The third capacitor is set to attenuate a PWM frequency component of the PWM control signal and a cutoff frequency of the fifth resistor and the fourth capacitor is set below a closed loop band in the first feedback path.

It is possible to achieve a switching regulator having good stability compatible with a good response. By utilizing two feedback paths provided to make good stability compatible with a good response, the protection function can be enhanced.

DETAILED DESCRIPTION OF THE PREFERRED EMBODIMENTS

Figure 1:
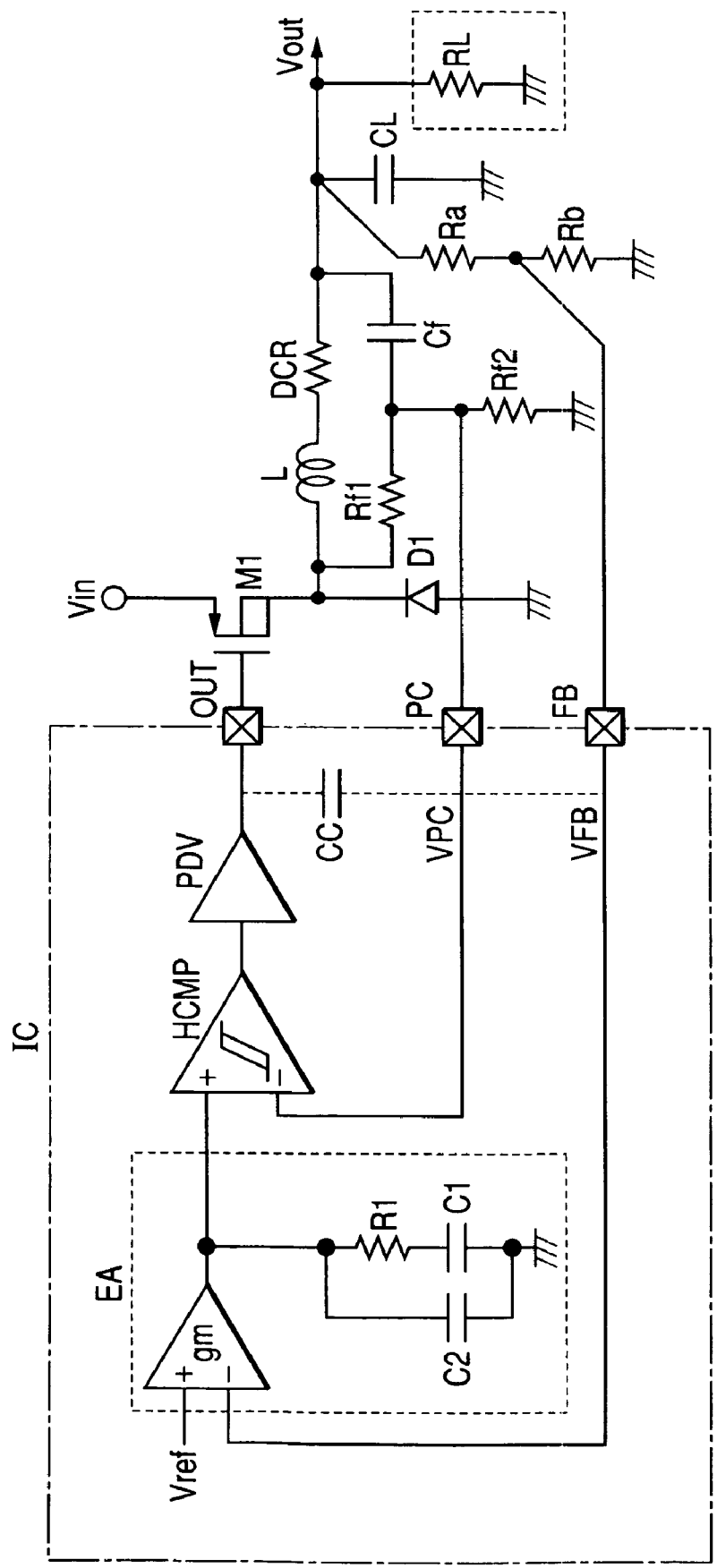
FIG. 1 is a circuit diagram showing one embodiment of a switching regulator according to this invention.

FIG. 1 shows a circuit diagram of one embodiment of a switching regulator according to this invention. To a voltage input terminal of the switching regulator of this embodiment, a DC voltage Vin is supplied from a DC power supply such as a battery cell. This voltage input terminal is connected to a source of a MOSFET M1 as a switching element. Thus, the MOSFET M1 is a P-channel MOSFET. A drain of the MOSFET M1 is connected to a cathode electrode of a diode D1. An anode electrode of the diode D1 is connected to a ground potential terminal. The drain of the MOSFET M1 is connected to an input end of an inductor (coil) L. An output end of the inductor L is connected to an output terminal for an output voltage Vout. A resistor DCR represents an equivalent DC resistance included in the inductor L. A smoothing capacitor CL is placed between the output terminal and a ground point.

A resistor Rf1 and a capacitor Cf which are connected in series are connected in parallel to the above coil L1. A resistor Rf2 is placed between a connection point of the resistor Rf1 and the capacitor Cf and a ground potential of the circuit. A voltage VCP at the above connection point is input to a hysteretic comparator HCMP via a first feedback terminal PC which is defined as an outside terminal of a semiconductor integrated circuit. The above circuit and the comparator HCMP constitute a first feedback path to generate a PWM control signal. This PWM control signal is supplied to a gate of the above switch MOSFET M1 via a pre-driver PDV. An output signal from the pre-driver PDV which is defined as an outside terminal of the semiconductor integrated circuit and formed on the semiconductor integrated circuit is transferred to the output terminal OUT. Thus, the comparator HCMP and the pre-driver PDV are circuits incorporated in the semiconductor integrated circuit.

A resistor denoted as RL is a semiconductor integrated circuit as a load such as a CPU or a hard disk drive which operates, supplied with the voltage Vout from the switching regulator of the present embodiment. By turning the switch MOSFET M1 on or off according to the above PWM control signal, a current corresponding to a duty ratio of the on/off control pulse is output from the coil L. Here, the hysteretic comparator HCMP is designed to make a threshold relatively high when a voltage which is input to its inverting input terminal (−) is lower than a reference voltage which is applied to its noninverting input terminal (+) and make the threshold lower by a predetermined potential when the voltage being input to its inverting input terminal (−) becomes higher than the reference voltage which is applied to its noninverting input terminal (+). Since such characteristic comparator circuit is publicly known, its specific exemplification and description are omitted. Preferably, a high input impedance circuit formed by MOSFETs is used as the comparator used in this embodiment.

In FIG. 1, a circuit IC in a section marked off by a chain line is constructed as a semiconductor integrated circuit on a single semiconductor chip such as a monocrystalline silicon chip. That is, the above comparator HCMP and pre-driver PDV are incorporated in the semiconductor IC and the coil L, capacitor CL, Resistors Rf1, Rf2, capacitor Cf, switch MOSFET M1, diode D1, and resistors Ra, Rb which will be described later are connected to the IC as external elements. Thereby, it is possible to realize the regulator with a high precision, for which a rising through rate of the output voltage Vout upon booting, which will be described later, is set with ease.

However, the regulator configuration is not limited to the foregoing. A second switch MOSFET which is turned on/off complementarily with the switch MOSFET M1 may be used instead of the above diode D1. In this case, however, a dead band of the above PWM control signal must be set to prevent a large current flow between the voltage input terminal and the ground point GND by turning both MOSFETs M1 and M2 on at the same time. The MOSFET M1 and the diode D1, additionally, the above second switch MOSFET may be formed on the semiconductor IC. Optionally, an N-channel MOSFET may be used as the MOSFET M1. In this case, the input voltage Vin boosted more than a threshold voltage of the MOSFET should be supplied to the gate.

In this embodiment, a second feedback path is provided to ensure good stability of PWM operation, while improving the load regulation. Voltage-dividing resistors Ra, Rb which divides the above output voltage Vout are placed. A fraction of the output voltage VFB, thus divided, is supplied to the error amplifier EA via a feedback terminal FB. The error amplifier EA generates a current signal corresponding to a difference between the feedback voltage VFB and the reference voltage Vref. This current signal is supplied to a load circuit having a frequency characteristic and a loop gain by the error amplifier EA is set. This load circuit is made up of a capacitor C2 and a series circuit consisting of a resistor R1 and a capacitor C1 placed in parallel to the capacitor C2. An output voltage of the error amplifier EA is supplied as the reference voltage to the noninverting input (+) of the hysteretic comparator HCMP.

Figure 2:
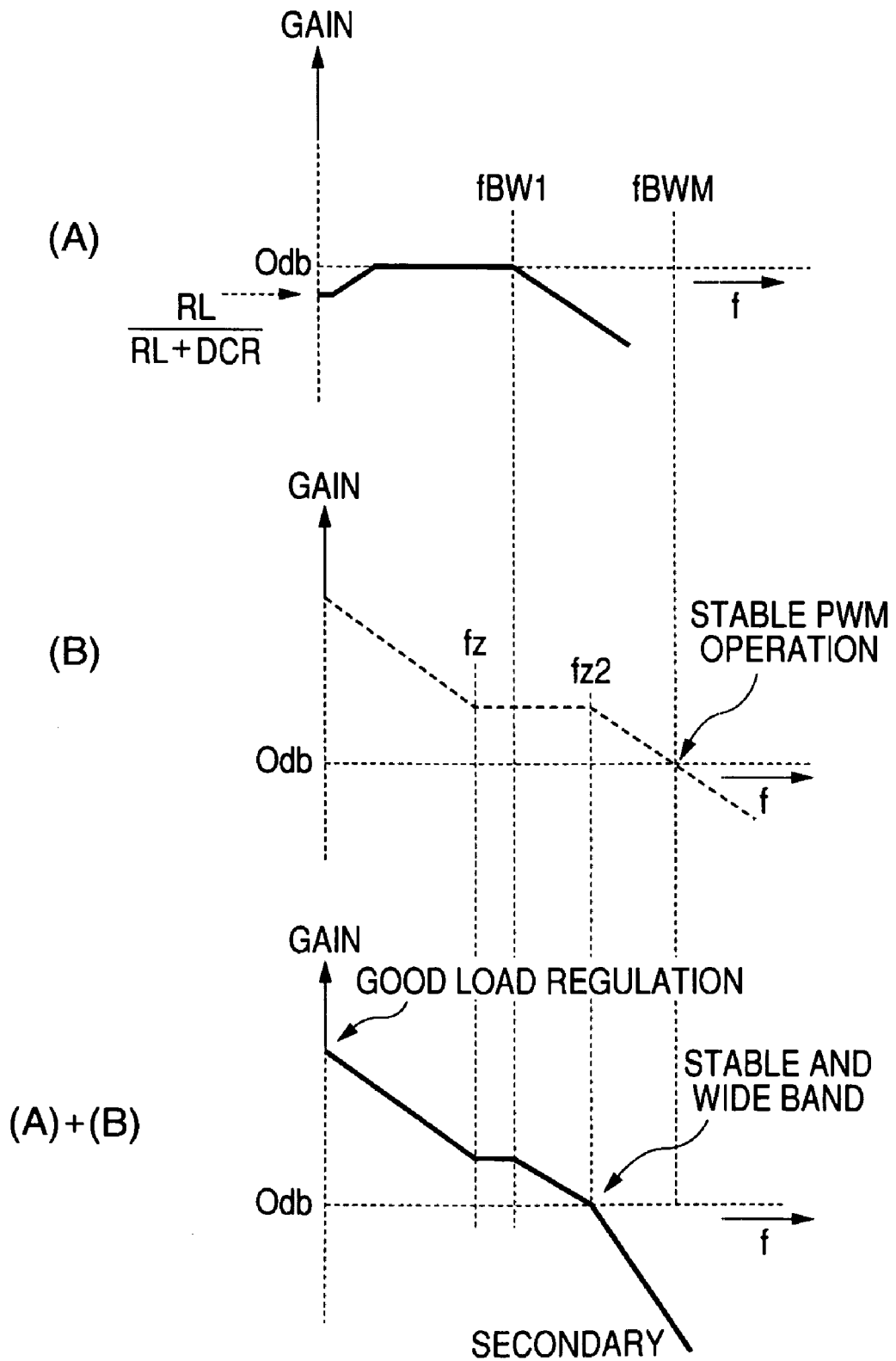
FIG. 2 shows frequency-gain characteristic graphs of the switching regulator of FIG. 1.
Figure 8:
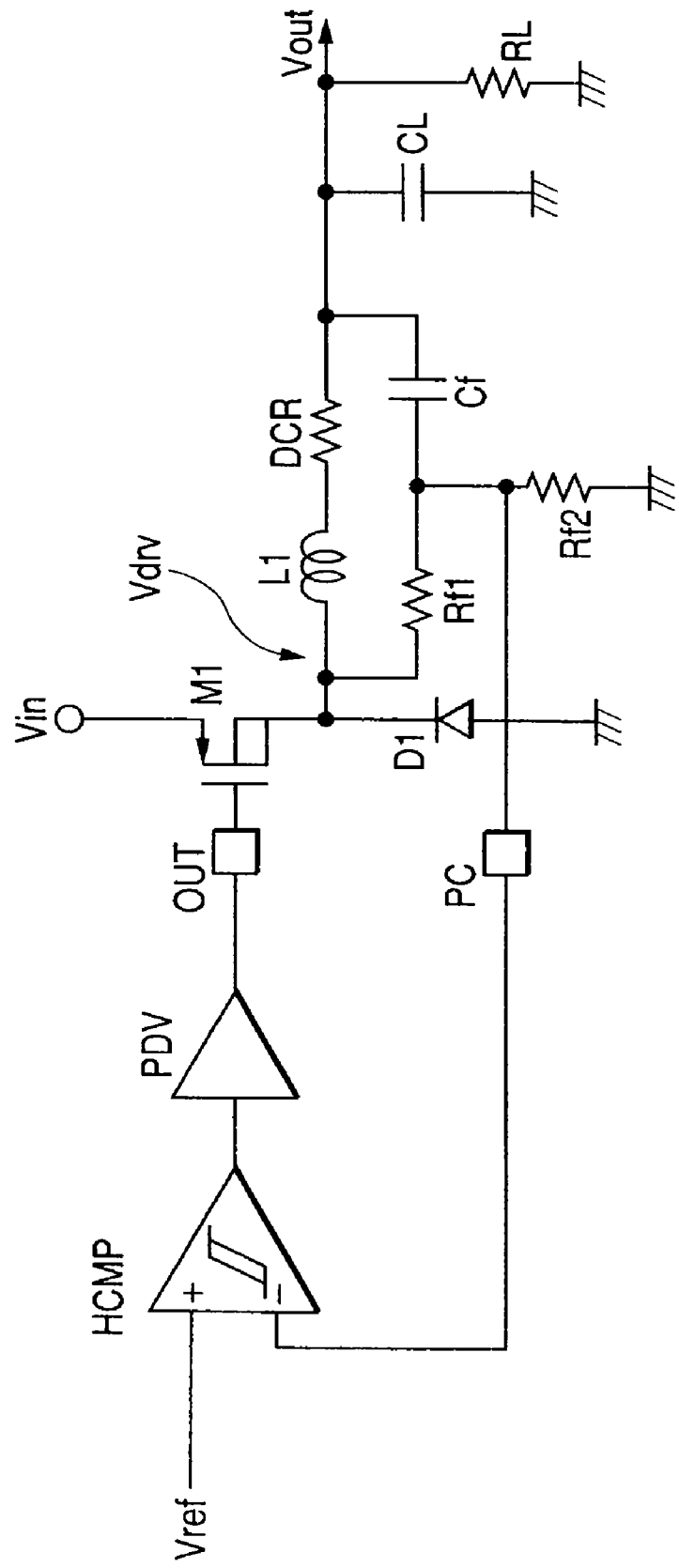
FIG. 8 is a circuit diagram showing one example of a prior-art switching regulator.

FIG. 2 shows frequency-gain characteristic graphs of the above switching regulator of FIG. 1. In the graph (A) for the basic regulator circuit of prior art of FIG. 8, the output voltage Vout decreases, as denoted by RL/(RL+DCR), and the load regulation is found to deteriorate. The graph B shows the gain of the error amplifier, wherein the gain increases, as the frequency decreases, due to that the capacitor C1 is dominant below the cutoff frequency fz of the resistor R1 and the capacitor C1. The gain remains constant owing to the resistor R1 for a range from the above cutoff frequency fz to a given frequency (fz2) below the PWM frequency, equivalently as is the case for the error amplifier EA of FIG. 9. As the frequency rises higher, the capacitor C2 becomes dominant, and the gain decreases, as the frequency increases, equivalently as is the case for the error amplifier EA of FIG. 11. If the gain by the capacitor C2 is designed to be 0 dB in the PWM frequency band fPWM, the load regulation improves in a low frequency domain and the loop gain will be less than 0 dB in the PWM frequency band fPWM, as the graph (A)+(B) indicates. Accordingly, the switching regulator of this embodiment can improve the response to load variation with stable PWM operation across a wide band, taken as a whole.

Figure 9:
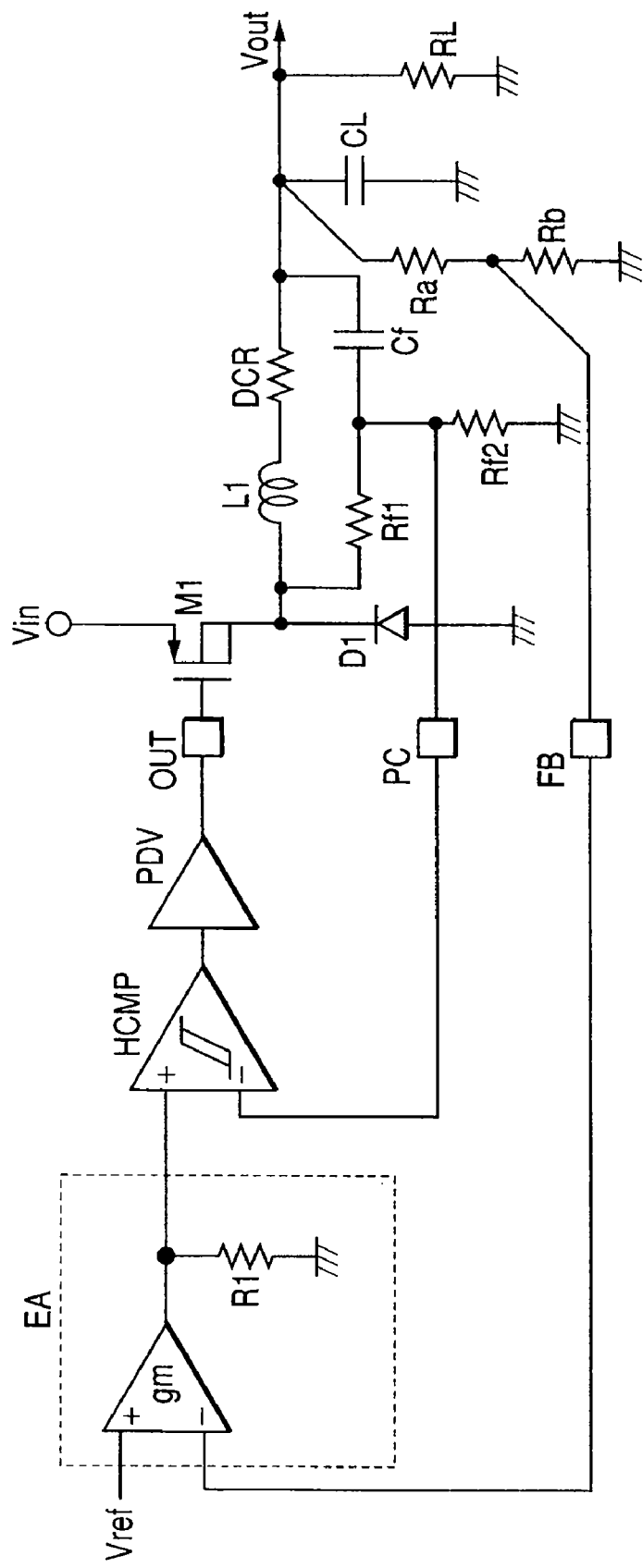
FIG. 9 is a circuit diagram showing another example of a prior-art switching regulator.
Figure 10:
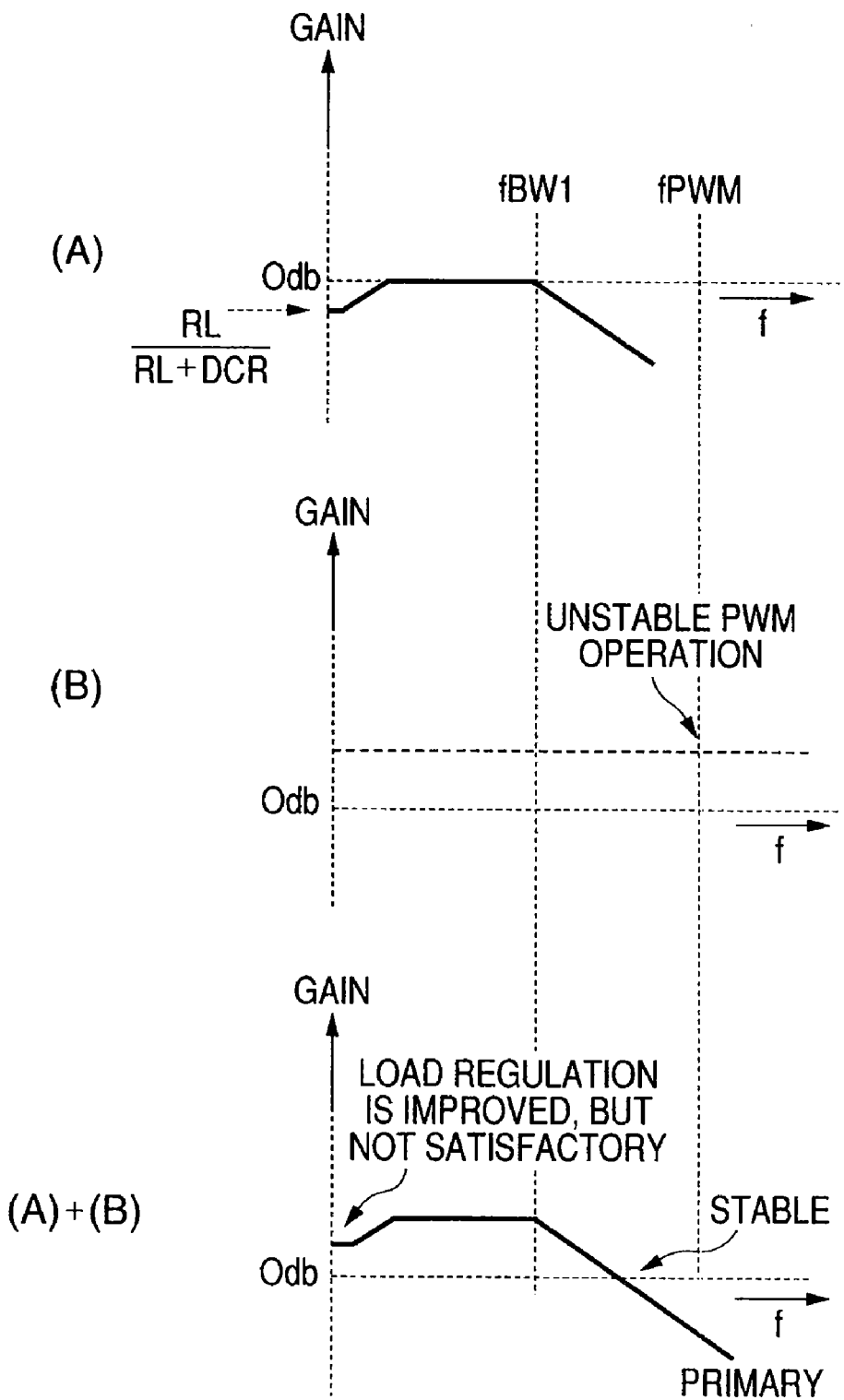
FIG. 10 shows frequency-gain characteristic graphs for the switching regulator of FIG. 9.
Figure 11:
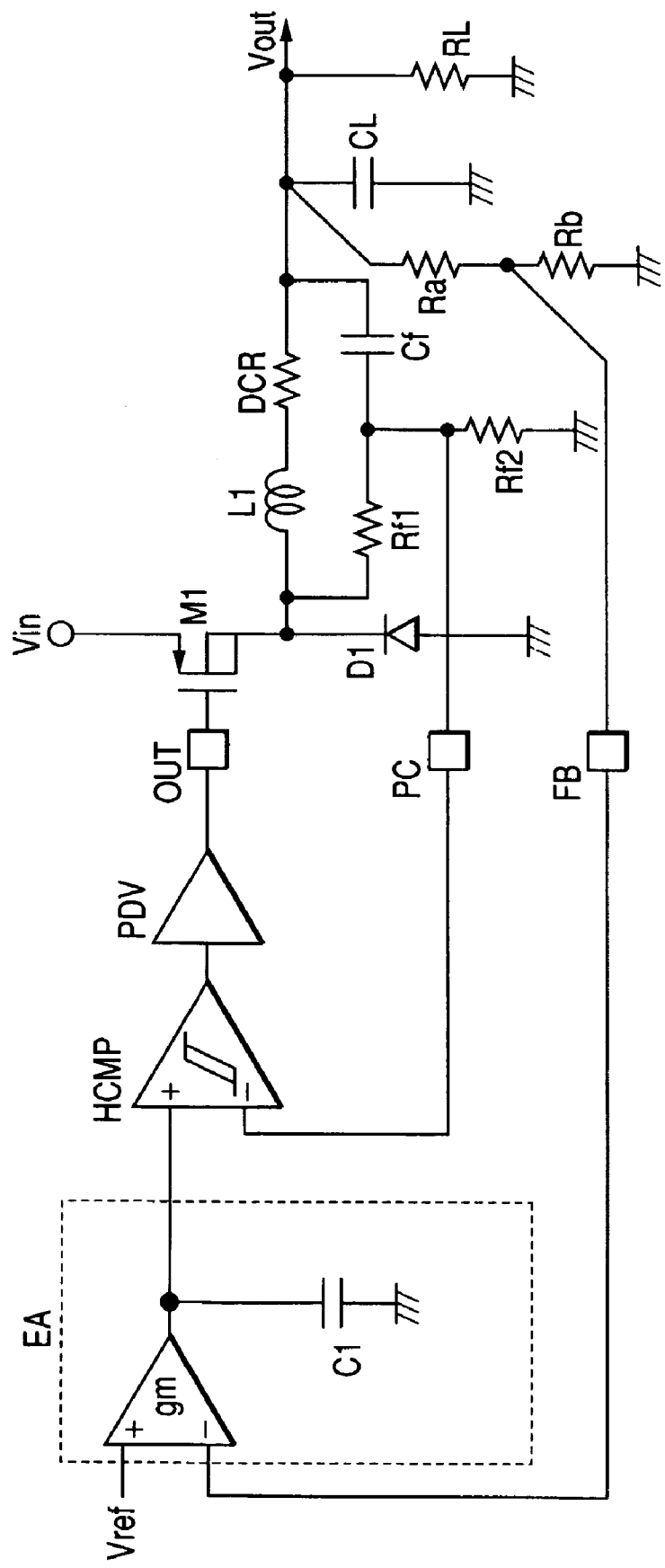
FIG. 11 is a circuit diagram of a switching regulator contemplated prior to this invention.
Figure 12:
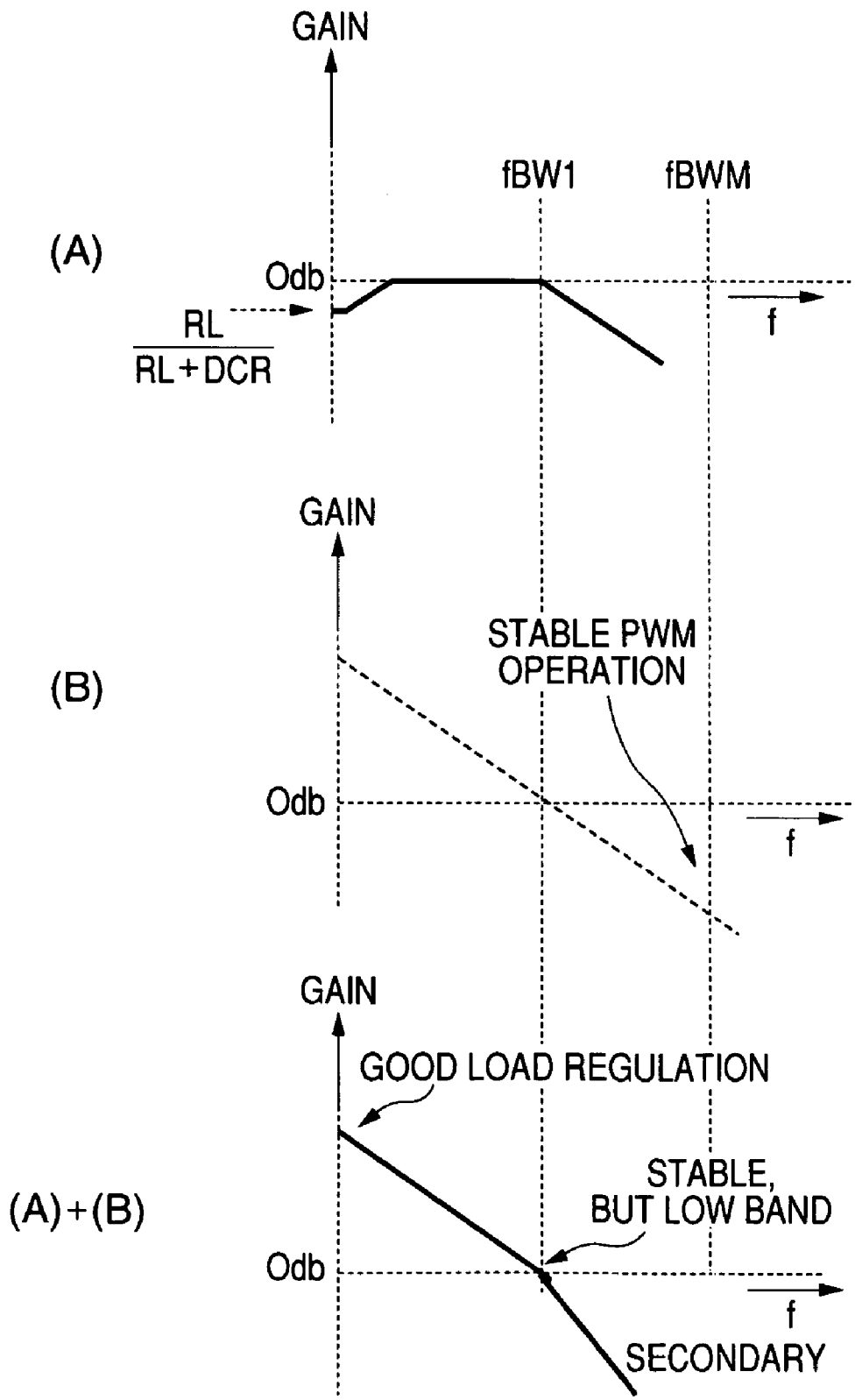
FIG. 12 shows frequency-gain characteristic graphs for the switching regulator of FIG. 11.

In the switching regulator of this embodiment, the error amplifier of what is called a PI (proportional and integral) control type, which is a combination of a P (proportional control type as shown in FIG. 9 and an I (integral) control type as shown in FIG. 11, is added to a CR feedback hysteretic regulator having the first feedback path, as described above. In the PWM frequency band, the gain will be less than 0 dB. A zero frequency is set so that a first-order lag characteristic is obtained at the zero cross frequency. It is thus possible to decrease the gain in a high frequency domain and increase the gain only in a low frequency domain, owing to the PI control type of the error amplifier EA. Consequently, (1) it is possible to prevent erroneous operation of the comparator by amplifying a ripple in the output voltage, affected by some gain in the high frequency domain, and (2) it is possible to prevent the load regulation deterioration by the equivalent series resistor DCR, because a sufficiently large gain can be obtained in the low frequency domain.

In FIG. 1, a second feedback terminal FB is located such that at least the first feedback terminal PC is placed between the terminal FB and the output terminal OUT. Thus, the terminals are properly placed such that substantially no parasitic capacitance CC is present between the output terminal OUT and the second feedback terminal FB. That is, coupling of the output terminal OUT and the second feedback terminal by the parasitic capacitance is prevented.

Figure 3A:
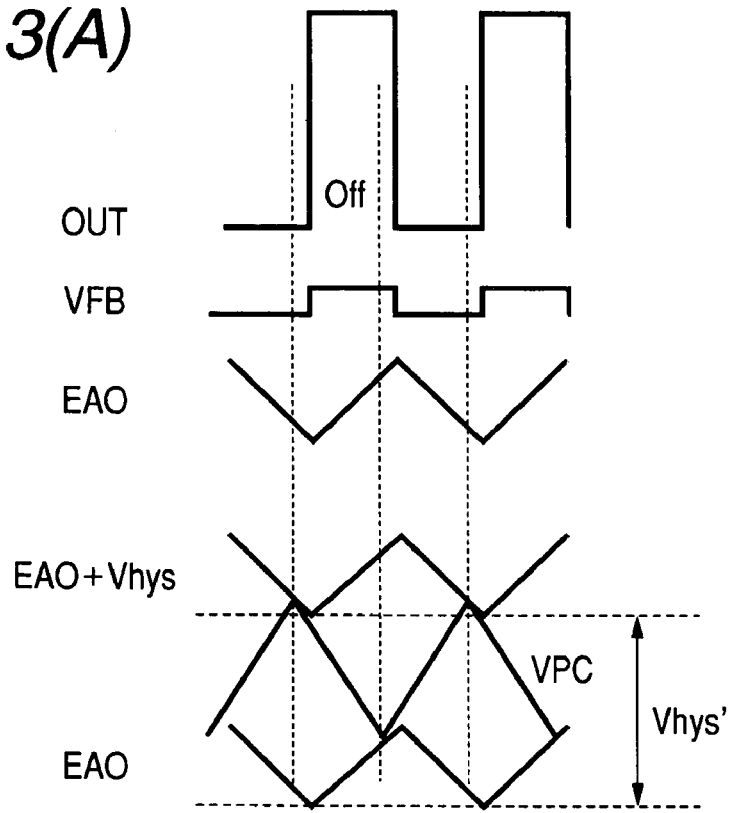
FIGS. 3A and 3B show waveform diagrams to explain an example of operation of the above switching regulator of FIG. 1.
Figure 3B:
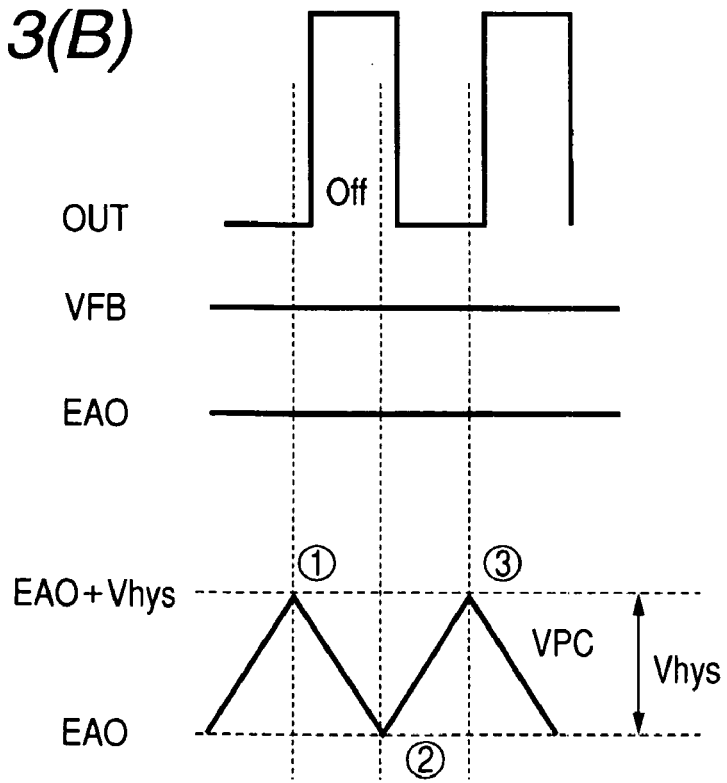

FIGS. 3A and 3B show waveform diagrams to explain an example of operation of the above switching regulator of FIG. 1. FIG. 3A shows waveform examples in a case where a coupling voltage VFB exists between the output terminal OUT and the second feedback terminal FB. While the feedback terminal FB is affected by the coupling voltage VFB pulsed in sync with PWM pulses, the error amplifier EA generates its amplified signal EAO as the reference voltage which is supplied to the hysteretic comparator HCMP. The hysteretic comparator HCMP generates a PWM signal by discriminating whether a feedback signal VPC from the first feedback terminal PC corresponding to the above load current and output voltage is appropriate by a differential voltage Vhsy' between two threshold voltages, one is the EOA that varies in proportion to the coupling VFB+Vhys and the other is the EOA. In consequence, this may give rise to erroneous PWM operation.

On the other hand, in a case where the terminals have been arranged as noted above, the second feedback voltage VFB actually not affected by a coupling voltage is constant and, accordingly, the error amplifier output EAO is constant, as shown in FIG. 3B. Consequently, the hysteretic comparator HCMP can generate a PWM signal properly by discriminating whether a feedback signal VPC from the first feedback terminal PC corresponding to the above load current and output voltage is appropriate by the voltage EAO+Vhys, namely, a hysteresis voltage Vhys added to the constant error amplifier output EAO. A power supply terminal or any other terminal may be placed between the second feedback terminal FB and the output terminal OUT, not limited to the first feedback terminal PC, and there is no restriction, provided such terminal does not cause significant variation.

Figure 4:
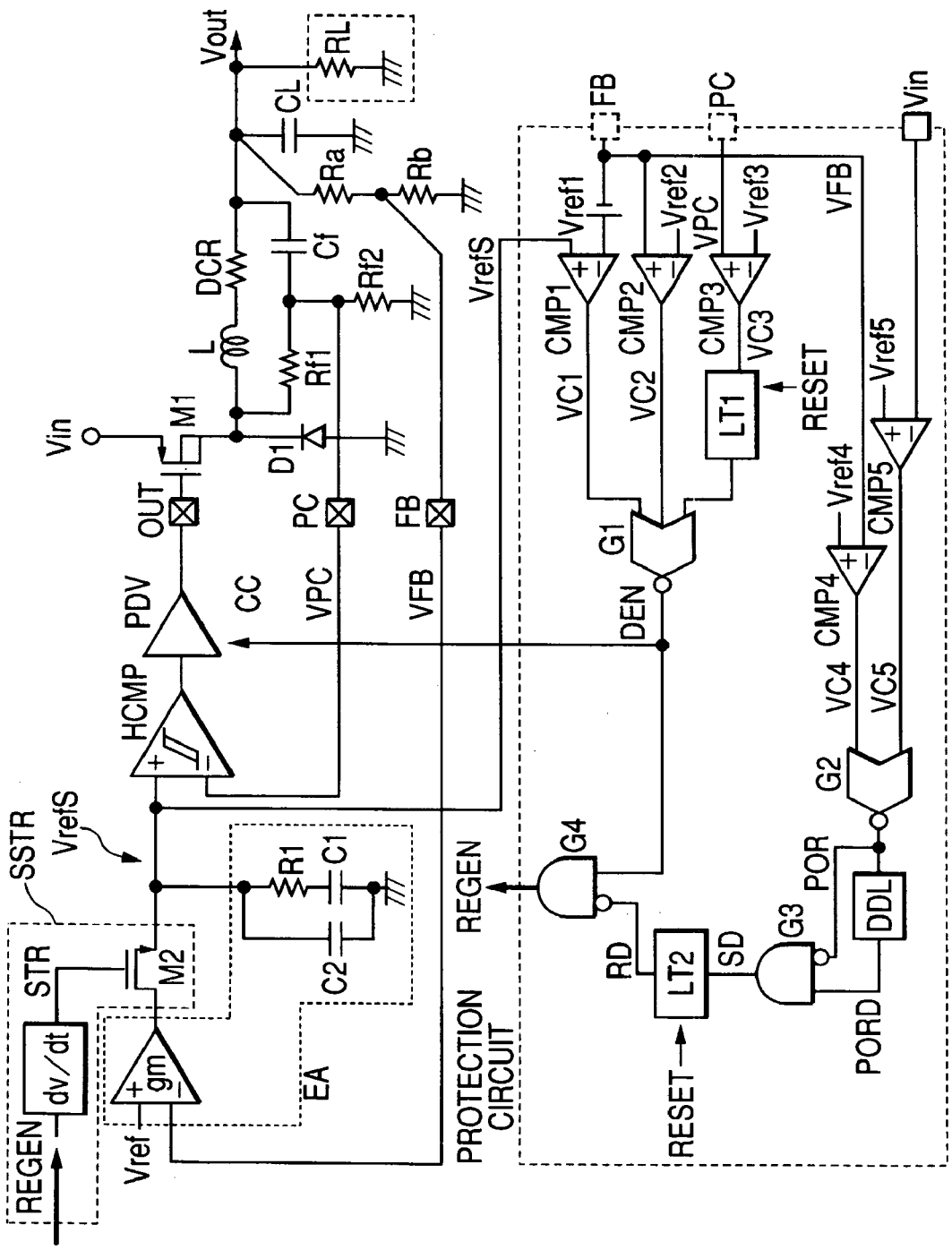
FIG. 4 is a circuit diagram showing another embodiment of a switching regulator according to this invention.

FIG. 4 shows a circuit diagram of another embodiment of a switching regulator according to this invention. In this embodiment, a soft start circuit SSTR and a protection circuit, as shown within dotted-line sections, are added to the foregoing circuitry of FIG. 1. These circuits are incorporated into the foregoing semiconductor IC.

The soft start circuit SSTR is made up of, but not limited to, a time constant circuit dV/dt which receives a power supply activation signal REGEN generated by the protection circuit and a MOSFET M2 whose switching is controlled by an output signal STR from the time constant circuit. This MOSFET M2 is placed between the foregoing error amplifier EA and the foregoing resistor R1 and capacitor C2.

Figure 5:
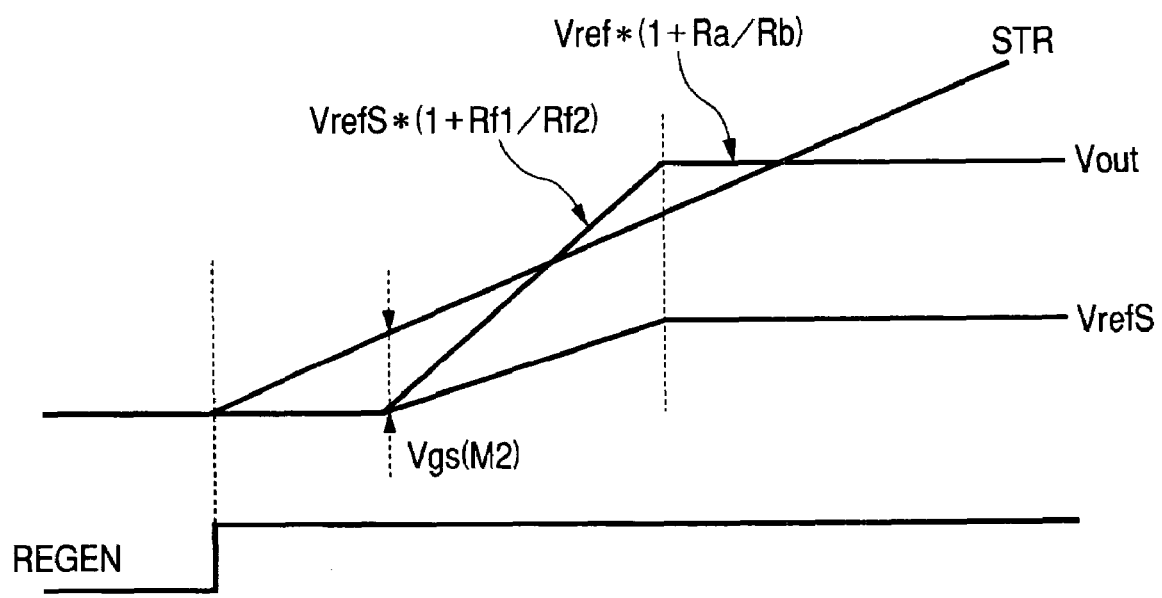
FIG. 5 shows a waveform diagram to explain the operation of a soft start circuit in FIG. 4.

The soft start circuit SSTR of this embodiment operates such that the time constant circuit dV/dt generates an output signal STR, when receiving a rising edge of the power supply activation signal REGEN, as shown in a waveform diagram of FIG. 5. When this output signal STR level exceeds a threshold voltage of the MOSFET M2, a start voltage VrefS which is lower by the threshold voltage of the MOSFET M2 than the signal STR level is generated. In other words, when the power supply is activated, the switching regulator operates as a regulator without the error amplifier, taking VrefS as the reference voltage.

Therefore, the output voltage Vout is an amplified signal of the above start voltage VrefS and rises in accordance with the start voltage VrefS and the ratio between the resistors Rf1/Rf2 as in the following equation (2): Vout=VrefS×(1+Rf1/Rf2) . . . (2). When a fractional voltage VFB of the output voltage Vout reaches the reference voltage Vref, the hysteretic comparator HCMP generates a PWM signal corresponding to the load current and output voltage variation and the output voltage Vout is stabilized as in the following equation (3): Vout=Vref×(1+Ra/Rb) . . . (3).

Because the output voltage Vout is set in accordance with the ratio between the resistors Ra and Rb in this embodiment, it is possible to optimize the activation time and activation through rate when the power supply is activated, by tuning the ratio between the external resistors Rf1 and Rf2 without having any effect on the output voltage Vout. In other words, the switching regulator according to the present invention can be adapted to the activation time and activation through rate required for a system in which the regulator is used, such as a CPU or a hard disk drive.

The protection circuit is made up of the following circuits utilizing the feedback voltage VFB from the foregoing second feedback terminal FB and the feedback voltage VPC from the foregoing first feedback terminal PC. The feedback voltage VFB is level shifted by reference voltage Vref1 and supplied to one input terminal (−) of a voltage comparator circuit CMP1. To another input terminal (+) of the voltage comparator circuit CMP1, the output voltage of the error amplifier EA, namely, the reference voltage VrefS from the hysteretic comparator HCMP is input. An output signal VC1 of the voltage comparator circuit CMP1 is used as a signal for detecting a load short circuit when the power supply is activated. That is, the feedback voltage VFB of the output voltage Vout is compared to the reference voltage VrefS at the activation. If the feedback voltage is out of line with the reference voltage, it is detected that a short circuit destruction occurs in the output smoothing capacitor CL or the load RL.

Figure 6:
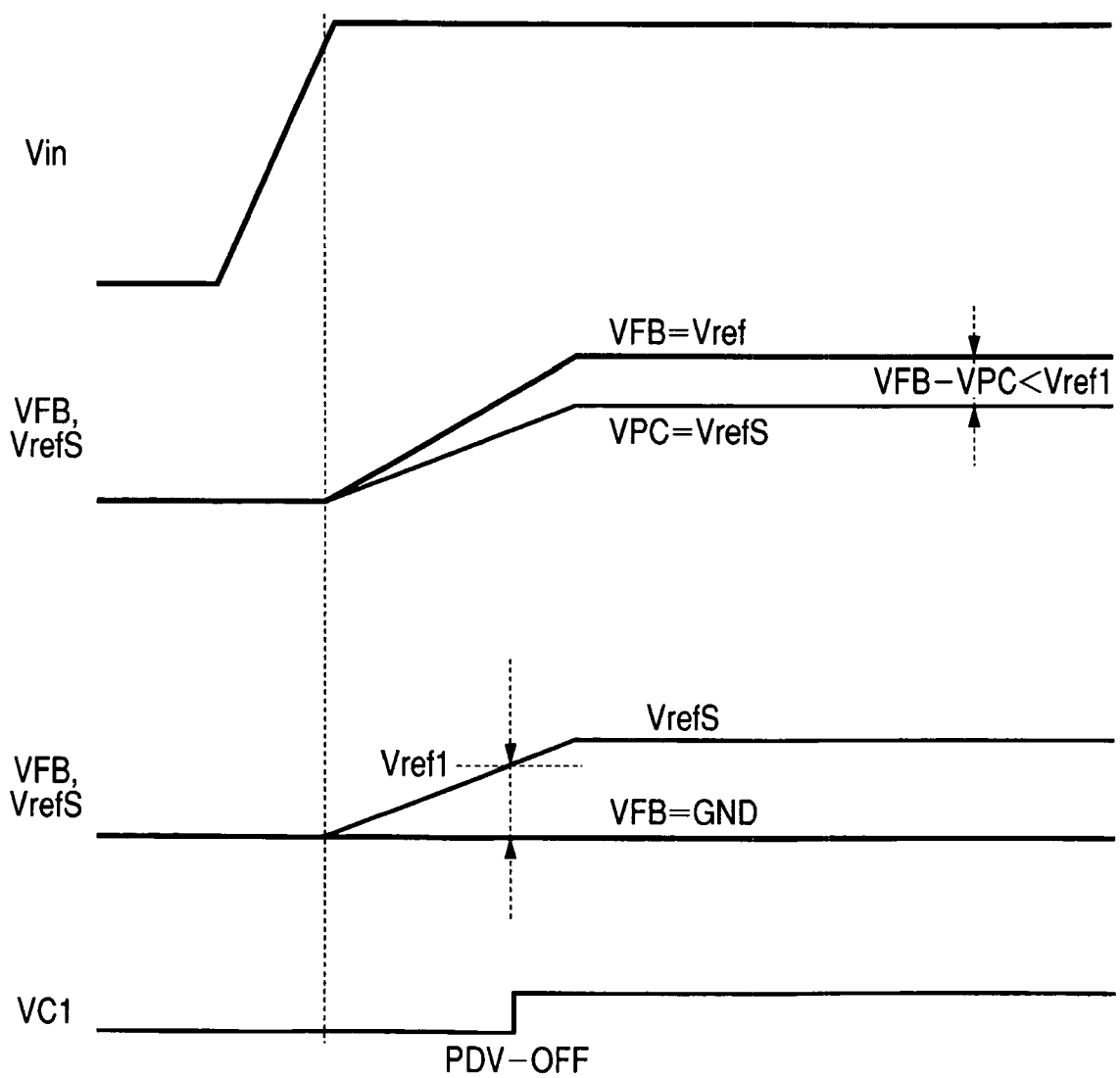
FIG. 6 shows a waveform diagram to explain the operation of a protection circuit in FIG. 4.

As shown in a waveform diagram of FIG. 6, when VFB−VPC <Vref1, the feedback voltage VFB is regarded as a normal state where it is in line with the reference voltage VrefS. In case a short circuit occurs in the load or the output smoothing capacitor CL, the feedback voltage VFB remains at 0 V, and the detecting signal VC1 changes to a high level when VFB−Vref1 <VrefS.

The above feedback voltage VFB is also supplied to one input terminal (+) of a voltage comparator circuit CMP2. To the other input terminal (−) of the voltage comparator circuit CMP2, a reference voltage Vref2 is supplied. This reference voltage Vref2 is a voltage corresponding to a maximum allowable voltage of the output voltage Vout. Thus, an output signal VC2 of the voltage comparator circuit CMP2 is used as a signal for detecting output overvoltage.

The above feedback voltage VPC is supplied to one input terminal (+) of a voltage comparator circuit CMP3. To the other input terminal (−) of the voltage comparator circuit CMP3, a reference voltage Vref3 is supplied. This reference voltage Vref3 is a voltage corresponding to a maximum allowable voltage of the voltage VPC during normal operation. An output signal VC3 of the voltage comparator circuit CMP3 is delivered via a latch circuit LT1. The power supply activation signal is used to reset the latch circuit LT1.

Each of the above detecting signals passes through a NOR gate circuit G1 and is delivered as an abnormal detection signal DEN. On the one hand, this signal DEN is delivered to control the pre-driver PDV and forcibly turns the output MOSFET M1 off. Thereby, the switching regulator can be prevented from being broken down, placed in an abnormal state as noted above. The signal DEN is also delivered to an AND gate circuit G4 which generates the power supply activation signal REGEN and stops the supply of the power supply activation signal REGEN.

The above feedback voltage VFB is also supplied to one input terminal (−) of a voltage comparator circuit CMP4. To the other input terminal (+) of the voltage comparator circuit CMP4, a reference voltage Vref4 is supplied. The reference voltage Vref4 is set at a minimum allowable voltage of the output voltage Vout. An output signal VC4 of the voltage comparator circuit CMP4 is used as a signal for detecting a load short-circuit after the activation. This detecting signal VC4 is at a low level (logic 0) during normal operation. The above detecting signal VC4 passes through a NOR gate circuit G2 and is delivered as a control signal POR to a negative input of an AND gate circuit G3. A delay signal PORD passed through a digital delay circuit DDL is delivered to a positive input of the AND gate circuit G3. An output signal SD of the AND gate circuit G3 is latched by a latch circuit LT2 and its output signal RD is delivered to a negative input of the AND gate circuit G4 which generates the above power supply activation signal REGEN. The latch circuit LT2 is reset by a power-on reset signal when the input voltage Vin is supplied.

The input voltage Vin is supplied to one input terminal (−) of a voltage comparator circuit CMP5. To the other input terminal (+), a reference voltage Vref5 is supplied. This reference voltage Vref5 corresponds to a minimum allowable voltage of the input voltage Vin. This voltage comparator circuit CMP5 detects that the input voltage Vin has been input normally and that the voltage required for stable operation of the switching regulator is supplied. Its detecting signal VC5 is supplied to the above OR gate circuit G2. Thereby, the above signals POR, PORD, SD, and RD are generated in accordance with the detecting signal VC5.

Figure 7:
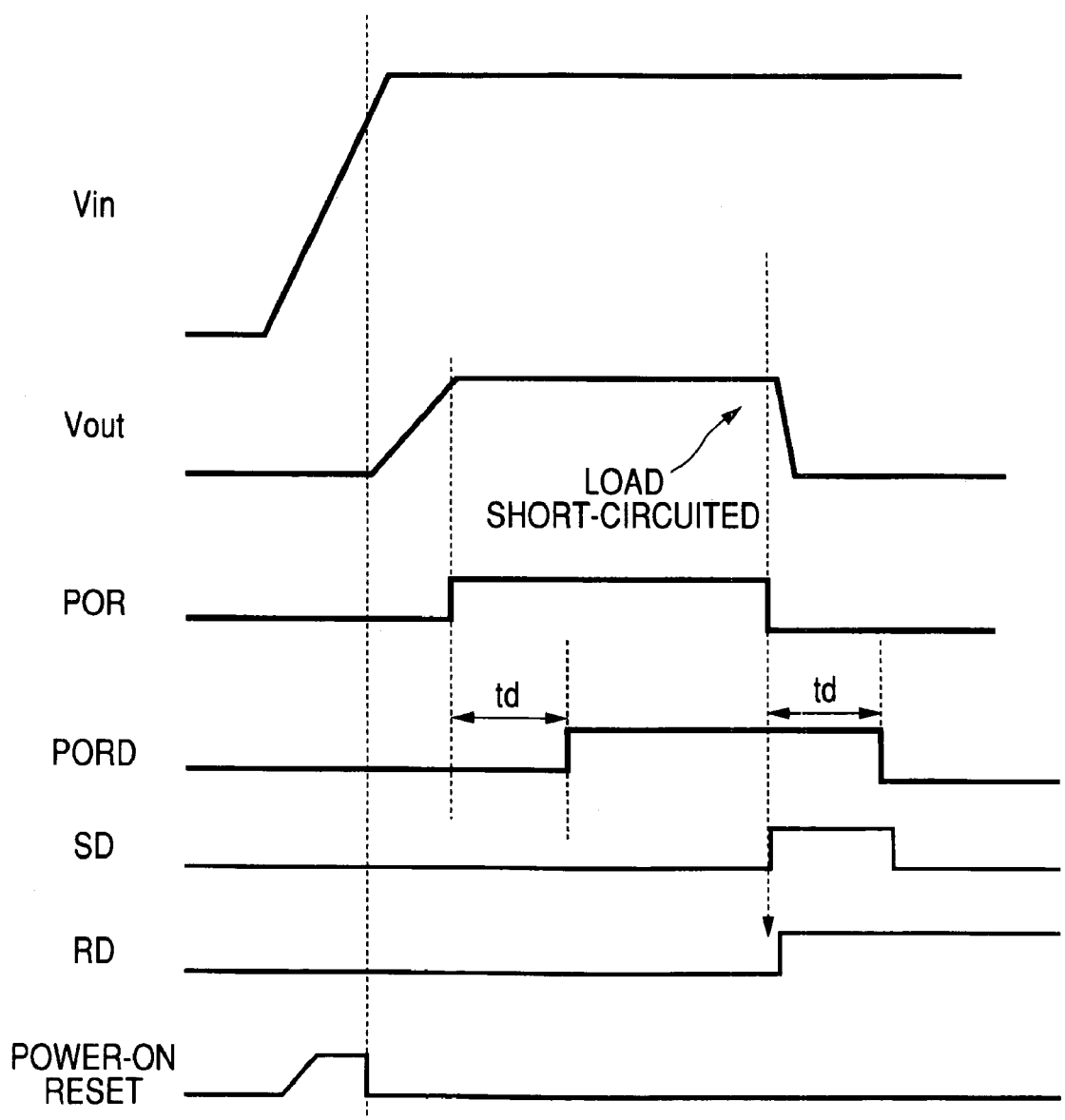
FIG. 7 shows a waveform diagram to explain the operation of the protection circuit in FIG. 4.

As shown in a waveform diagram of FIG. 7, the input voltage Vin is normally input and rises, and the above latch circuit LT2 is reset by the power-on reset signal. If no abnormality is detected by any of the above detecting signals VC1, VC2, VC3, VC4, and VC5, the power supply activation signal REGEN which is output from the gate circuit G4 rises, which is not shown here. The switching regulator starts to operate normally and the output voltage Vout is stabilized at a desired voltage. In this state, if a load short-circuit occurs, the detecting signal VC4 changes to a high level, the output signal POR of the NOR gate circuit G3 changes to a low level, and the signal PORD changes to a low level at a delayed time. Accordingly, the pulse SD which changes to a high level at the delayed time is generated by the AND gate circuit G3. This signal SD is latched by the latch circuit LT2 and the signal RD is turned to a high level simultaneously. Accordingly, the power supply activation signal REGEN generated by the AND gate circuit G4 changes to a low level and the switching regulator operation is deactivated.

When the above input voltage Vin is input normally and rises, the output signal SD of the gate circuit G3 remains at the low level and the detecting signal SD is generated only when the load short-circuit occurs. This operation is also performed when the input voltage Vin drops below the voltage required for stable operation of the switching regulator. That is, because the voltage comparator circuit VC5 generates the detecting signal VC5 which changes to a high level, the power supply activation signal REGEN is turned to the low level and the switching regulator operation is deactivated, as above. Therefore, once the switching regulator operation has been deactivated by the detecting signal VC4 or VC5, in order to reactivate the regulator, it is necessary to stop the input voltage Vin once, re-supply it, and generate the power-on reset signal.

The switching regulator of this embodiment enables improving the precision of the output voltage and improving the reliability of the regulator. Because this regulator is capable of a more speedy response to variation in the load current, its reliability can be enhanced. Along with the realization of the soft start function, detecting a malfunction of external parts and realizing the protection of the regulator, other external parts, and the load are enabled, and, therefore, product reliability can be enhanced. Particularly, power supply arrangements for CPUs, hard disk drives, and the like, as mentioned above, tend to be required to supply 1.3 V or a lower voltage, whereas the maximum output current as large as 2 A is required. Therefore, the switching regulator of the present invention capable of improving the load regulation, enhancing the precision of the output voltage, and a more speedy response to variation in the load current is useful particularly for these applications.

While the invention made by the present inventors has been described specifically hereinbefore, based on the foregoing embodiments, the present invention is not limited to the described embodiments and various changes may be made without departing from the gist of the invention. For example, a modification example described in the above-mentioned Patent Document 2 can be adopted as the first feedback path for generating PWM signals. A power supply terminal, a circuit grounding terminal, or any other terminal may be located between the output terminal OUT and the feedback terminal FB, thus preventing the coupling effect as noted above. The amplification sections of the hysteretic comparator HCMP, the pre-driver PDV, and the error amplifier can be appropriately configured and embodied in various forms. This invention can have a wide range of applications as a switching regulator.

What is claimed is:
1. A switching regulator comprising:
an inductor;
a first capacitor arranged between an output end of the inductor to generate an output voltage and a ground potential;
a first switch element to supply a current from an input voltage to an input end of the inductor;
a second switch element, which is turned on when the first switch element is turned off, and energizes the input end of the inductor to a predetermined potential; and
a control circuit which generates a PWM control signal supplied to the first switch element so that the output voltage matches a desired voltage, the control circuit having a first feedback path and a second feedback path,
wherein the first feedback path includes:
a hysteretic comparator circuit; and
a series circuit with a first resistor and a second capacitor placed in parallel to the inductor,
wherein the hysteretic comparator circuit receives a first reference voltage and a potential at a connection point of the first resistor and the second capacitor, determines whether the potential satisfies a first threshold and a second threshold, and generates the PWM control signal to vary the current flowing through the inductor in accordance with an output current variation,
wherein the second feedback path includes:
a third resistor and a fourth resistor to generate a fractional voltage of the output voltage; and
an error amplifier circuit which receives the fractional voltage and a second reference voltage,
wherein the error amplifier circuit generates the first reference voltage for input to the hysteretic comparator circuit, and
wherein the error amplifier circuit is a PI control error amplifier circuit,
wherein the first switch element includes a single power MOSFET,
wherein the hysteretic comparator circuit and the error amplifier circuit are formed in a semiconductor integrated circuit,
wherein the first resistor and the second capacitor of the series circuit are external to the semiconductor integrated circuit,
wherein the third resistor and the fourth resistor of the second feedback path are external to the semiconductor integrated circuit,
wherein the semiconductor integrated circuit includes a first terminal for control of the first switch element, a second terminal for the first feedback path, and a third terminal for the second feedback path,
wherein at least the second terminal is arranged between the first terminal and the third terminal,
wherein a switch MOSFET is arranged between an output terminal of the error amplifier circuit and an input terminal at which the first reference voltage is input to the hysteretic comparator circuit, the switch MOSFET being formed in the semiconductor integrated circuit,
wherein the first feedback path includes a second resistor arranged between the connection point of the first resistor and the second capacitor and a ground potential of the circuit, and
wherein a gate of the switch MOSFET is controlled by a control voltage generated by a time constant circuit which receives a power supply activation signal.

2. The switching regulator according to claim 1,
wherein the error amplifier circuit includes:
a first current amplifier;
a third capacitor arranged between an output terminal of the first current amplifier and a ground potential of the error amplifier circuit; and
a series circuit comprising a fifth resistor and a fourth capacitor arranged between the output terminal of the first current amplifier and the ground potential of the error amplifier circuit.

3. The switching regulator according to claim 2,
wherein the third capacitor of the error amplifier circuit is set to attenuate a PWM frequency component of the PWM control signal, and
wherein a cutoff frequency of the fifth resistor and the fourth capacitor is set below a closed loop band of the first feedback path.

4. The switching regulator according to claim 3,
wherein the input voltage is 5 V or above, and
wherein the output voltage is 3.3 V or below.

* * * * *